(12) United States Patent
Chen

(10) Patent No.: US 11,476,660 B2
(45) Date of Patent: Oct. 18, 2022

(54) DEVICE AND METHOD OF PROTECTING SUPERCAPACITOR MODULE OF VEHICLE

(71) Applicant: Fu-Chieh Chen, Taichung (TW)

(72) Inventor: Fu-Chieh Chen, Taichung (TW)

( * ) Notice: Subject to any disclaimer, the term of this patent is extended or adjusted under 35 U.S.C. 154(b) by 0 days.

(21) Appl. No.: 17/233,567

(22) Filed: Apr. 19, 2021

(65) Prior Publication Data

US 2021/0336434 A1    Oct. 28, 2021

(51) Int. Cl.
*H02H 7/20* (2006.01)
*H02H 1/00* (2006.01)
*H02J 7/00* (2006.01)
*B60R 16/033* (2006.01)

(52) U.S. Cl.
CPC .......... *H02H 7/20* (2013.01); *H02H 1/0007* (2013.01); *H02J 7/0029* (2013.01); *B60R 16/033* (2013.01)

(58) Field of Classification Search
CPC .... B60R 16/033; B60R 16/03; H01M 16/003; H02H 1/0007; H02H 7/20; H02H 7/18; H02H 7/16; H02H 7/205; H02J 7/0029; H02J 7/00302; H02J 7/00304; H02J 7/00306; H02J 7/00308; H02J 7/00309; H02J 7/0036; H02J 7/34; H02J 7/342; H02J 7/345; Y02E 60/13; Y02E 60/50
See application file for complete search history.

(56) References Cited

U.S. PATENT DOCUMENTS

| | | | |
|---|---|---|---|
| 2012/0235511 A1* | 9/2012 | Watson | B60L 3/0046 307/109 |
| 2012/0319471 A1* | 12/2012 | Miller | B60L 58/13 307/66 |
| 2013/0264875 A1* | 10/2013 | Kaminsky | H01M 50/20 307/52 |
| 2020/0295412 A1* | 9/2020 | Chen | H01M 10/4264 |
| 2021/0028642 A1* | 1/2021 | Imre | H01M 10/482 |

FOREIGN PATENT DOCUMENTS

| | | | |
|---|---|---|---|
| CN | 206234037 U | * | 6/2017 |
| CN | 206234037 U | | 6/2017 |

* cited by examiner

*Primary Examiner* — Jared Fureman
*Assistant Examiner* — Nicolas Bellido

(57) ABSTRACT

A method of protecting a supercapacitor module of a vehicle contains steps of: A) installing; B) judging; C) executing a protection mode; and D) executing an operating mode. In the step A), an open circuit remains between the rechargeable battery and the supercapacitor module, and a voltage value of the supercapacitor module is 0. In the step B) the supercapacitor module is judged whether being satisfied with a protection condition, an external voltage is V1, a fully charging voltage of the supercapacitor module is V2, an ambient temperature value of the supercapacitor module is T1, and a safe temperature value of a respective supercapacitor is T2. In the step C), when the supercapacitor module is satisfied with the protection condition, the protection mode is executed. In the step D), when a connection circuit between the supercapacitor module and the rechargeable battery occurs, the supercapacitor module is rechargeable and dischargeable electrically.

20 Claims, 3 Drawing Sheets

DEVICE AND METHOD OF PROTECTING SUPERCAPACITOR MODULE OF VEHICLE

FIELD OF THE INVENTION

The present invention relates to a power supply to a vehicle, and more particularly to a method and a device of protecting a supercapacitor module of the vehicle.

BACKGROUND OF THE INVENTION

A conventional power supply unit of a vehicle contains a rechargeable battery configured to start a motor and the other power-consumption devices, such as an Electronic Control Unit (ECU) and a headlight. The rechargeable battery supplies a power to drive the starter to operate, the starter drives an engine of the vehicle to operate, and the engine actuates a power generator to operate and to recharge the power to the rechargeable battery.

With reference to FIG. 1, a power supply unit 10 contains a supercapacitor module 12 and a rechargeable battery 14 which are connected parallelly. When starting the engine, the supercapacitor module 12 supplies a power to a starter, and the supercapacitor module 12 has a discharge of large electric currents and recharge, thus prolong a service of the power supply unit 10.

When installing the supercapacitor module 12, a resistance having a large resistance value is connected with the supercapacitor module 12, the supercapacitor module 12 is connected with the rechargeable battery 14, and the resistance is removed. Thereby, when the supercapacitor module 12 and the rechargeable battery 14 are connected, the rechargeable battery 14 recharges to the supercapacitor module 12, and the supercapacitor module 12 is not discharged, this avoiding user getting an electric shock.

After starting the engine, the power generator produces electricity in a voltage of 14V. When the engine stalls, the voltage reduces to 13V. When the vehicle runs and an air conditioner is not turned on, an output voltage of the power generator is 13.2V. After turning the air conditioner, the output voltage of the power generator is within 13.5V to 13.6V. Normally, when the power generator recharges the power to the supercapacitor module 12, the supercapacitor module is not broken. However, a temperature of the supercapacitor module 12 increases when a voltage of the power generator increases, thus damaging the supercapacitor module 12.

The supercapacitor module 12 is comprised of multiple supercapacitors, wherein when one supercapacitor is broken (for example, an electrode sheet has a short circuit) and an electricity recharging goes on, a temperature of the electrode sheet increases to heat electrolyte of the supercapacitor, and a pressure of an interior of the supercapacitor module 12 enhances, thus causing explosion.

The present invention has arisen to mitigate and/or obviate the afore-described disadvantages.

SUMMARY OF THE INVENTION

The primary objective of the present invention is to provide a method of protecting a supercapacitor module of a vehicle which enhances a safety to protecting the supercapacitor module when installing the supercapacitor module.

Another objective of the present invention is to provide a device of protecting a supercapacitor module of a vehicle which executes the method of protecting the supercapacitor module of the vehicle.

To obtain above-mentioned objectives, a method of protecting a supercapacitor module of a vehicle provided by the present invention is applicable for a power supply unit of the vehicle, and the power supply unit includes the supercapacitor module and a rechargeable battery connected with the supercapacitor module parallelly.

The method contains steps of:

A) installing, wherein an open circuit remains between the rechargeable battery and the supercapacitor module, a voltage value of the supercapacitor module is 0, and the supercapacitor module is arranged in the power supply unit;

B) judging, wherein the supercapacitor module is judged whether the supercapacitor module is satisfied with a protection condition, an external voltage is V1, a fully charging voltage of the supercapacitor module is V2, an ambient temperature value of an interior of the supercapacitor module is T1, and a safe temperature value of a respective supercapacitor is T2, wherein when V1 is more than V2 (V1>V2) or T1 is more than T2 (T1>T2), the supercapacitor module is satisfied with the protection condition, and when V1 is not more than V2 or T1 is not more than T2, the supercapacitor module is not satisfied with the protection condition;

C) executing a protection mode, wherein when the supercapacitor module is satisfied with the protection condition, the protection mode is executed, wherein the open circuit occurs between the supercapacitor module and the rechargeable battery so that the supercapacitor module is not rechargeable and dischargeable electrically; and D) executing an operating mode when the supercapacitor module is not satisfied with the protection condition, wherein when a connection circuit between the supercapacitor module and the rechargeable battery occurs, the supercapacitor module is rechargeable and dischargeable electrically.

When the supercapacitor module is in the protection mode or the operating mode, the step B) is executed so as to further execute the protection mode or the operating mode based on a result of the step B).

DETAILED DESCRIPTION OF THE PREFERRED EMBODIMENTS

Figure 1:
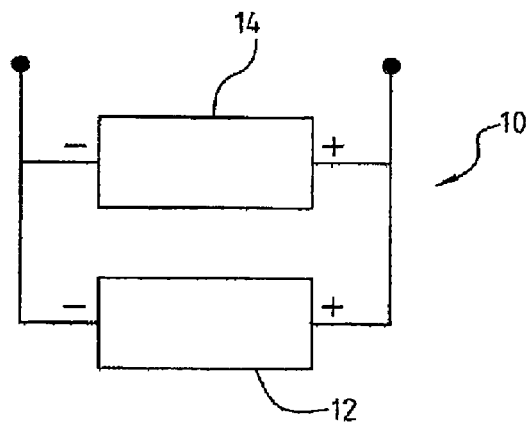
FIG. 1 is a circuit block diagram of a conventional power supply unit.
Figure 2:
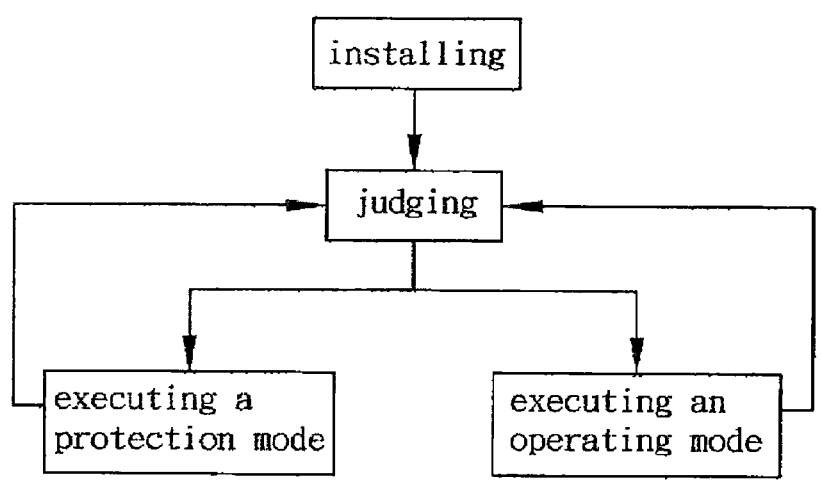
FIG. 2 is a flow chart of a method of protecting a supercapacitor module of a vehicle according to a preferred embodiment of the present invention.
Figure 3:
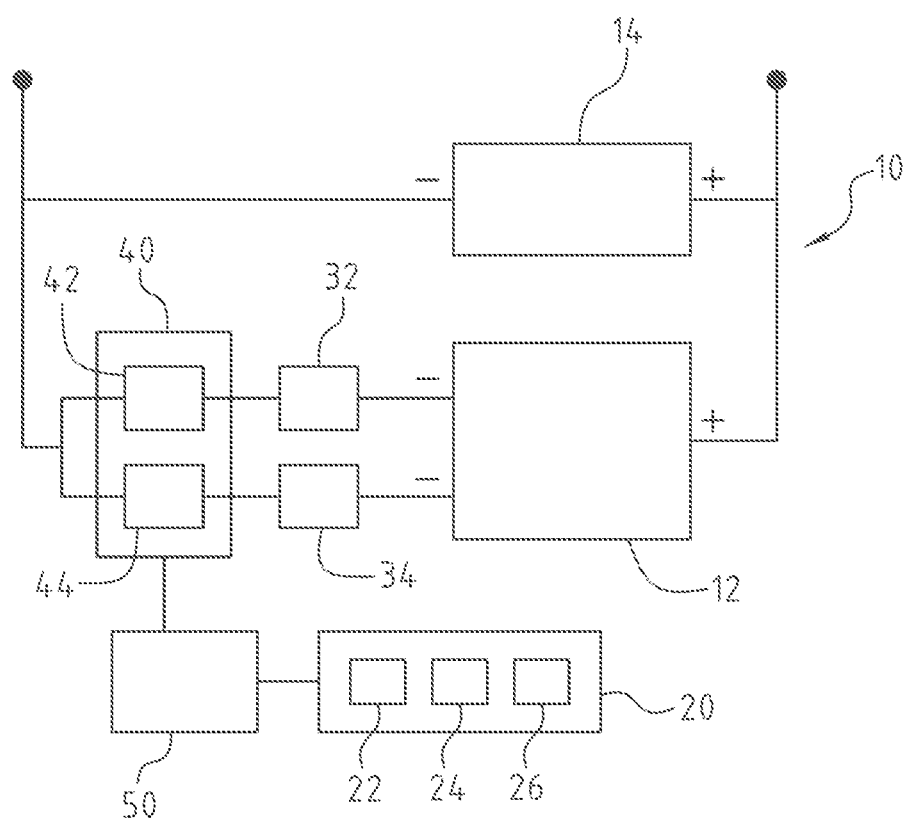
FIG. 3 is a circuit block diagram of a power supply unit of a device of protecting the supercapacitor module according to the preferred embodiment of the present invention.

With reference to FIGS. 2 and 3, a method of protecting a supercapacitor module of a vehicle according to a preferred embodiment of the present invention is applicable for a power supply unit 10 of the vehicle, and the power supply unit 10 includes the supercapacitor module 12 and a rechargeable battery 14 connected with the supercapacitor module 12 parallelly.

The method of protecting the supercapacitor comprises steps of:

A) installing, wherein an open circuit remains between the rechargeable battery 14 and the supercapacitor module 12 after an engine of the vehicle stalls, a voltage value of the supercapacitor module 12 is 0, and the supercapacitor module 12 is arranged in the power supply unit 10, wherein the supercapacitor module 12 includes multiple supercapacitors (not shown) which are connected serially or parallelly, and the supercapacitor module 12 is discharged electrically before being arranged in the power supply unit 10 so as to protect a user;

B) judging, wherein the supercapacitor module 12 is judged whether it is satisfied with a protection condition, for example, an external voltage is V1, and a fully charging voltage of the supercapacitor module is V2, the external voltage V1 is the voltage of the rechargeable battery 14 when the engine stalls, and the external voltage V1 is a higher voltage selected from a voltage of the power generator and the voltage of the rechargeable battery 14 when a power generator of the vehicle operates, wherein the fully charging voltage V2 of the supercapacitor module 12 is 14.5V but is not limited to 14.5V, an ambient temperature value of an interior of the supercapacitor module 12 is T1, and a safe temperature value of a respective supercapacitor of the supercapacitor module 12 is T2, wherein the safe temperature value T2 is determined based on an overheating temperature of the respective supercapacitor, and the safe temperature value T2 is 80° C.; wherein when V1 is more than V2 (i.e. V1>V2) or T1 is more than T2 (i.e. T1>T2), the supercapacitor module 12 is satisfied with the protection condition, and when V1 is not more than V2 or T1 is not more than T2, the supercapacitor module 12 is not satisfied with the protection condition;

C) executing a protection mode, wherein when the supercapacitor module 12 is satisfied with the protection condition, the protection mode is executed, wherein the open circuit occurs between the supercapacitor module 12 and the rechargeable battery 14 so that the supercapacitor module 12 is not rechargeable and dischargeable electrically, thus avoiding V1 being higher than V2, and when T1 is more than T2, the supercapacitor module 12 is not rechargeable electrically, such that an over-high temperature and a vaporized explosion of the respective supercapacitor are avoidable; and D) executing an operating mode when the supercapacitor module 12 is not satisfied with the protection condition, wherein when a connection circuit between the supercapacitor module 12 and the rechargeable battery 14 occurs, the supercapacitor module 12 is rechargeable and dischargeable electrically.

When the supercapacitor module 12 is in the protection mode or the operating mode for a period of time, the step B) is executed so as to judge whether the supercapacitor module 12 is satisfied with the protection condition, such that the protection mode or the operating mode is executed based on a result of the step B).

By judging whether the supercapacitor module 12 is satisfied with the protection condition, the protection mode or the operating mode to the supercapacitor module 12 is determined so as to recharge or discharge the supercapacitor module 12 electrically, thus avoiding recharging the supercapacitor module 12 in an overly high voltage or temperature.

When the engine stalls and the open circuit between the rechargeable battery 14 and the supercapacitor module 12 occurs, the supercapacitor module 12 is installed in the power supply unit 10, wherein the supercapacitor module 12 is discharged completely before being installed so that the voltage of the supercapacitor module 12 is 0, thus protecting the user.

Referring to FIG. 3, the protection device comprises: a detection unit 20, a main circuit 32, an auxiliary circuit 34, a control unit 40, and a processing unit 50, wherein the detection unit 20 is electrically connected with the processing unit 50, and the detection unit 20 includes a first voltage detector 22, a second voltage detector 24, and a temperature sensor 26, wherein the first voltage detector 22 is configured to detect the external voltage V1, the second voltage detector 24 is configured to detect the voltage V3 of the supercapacitor module 12, the temperature detector 26 is configured to detect the ambient temperature value T1 of the supercapacitor module 12, wherein detection results of the first voltage detector 22, the second voltage detector 24, and the temperature sensor 26 are sent to the processing unit 50 from the first voltage detector 22, the second voltage detector 24, and the temperature sensor 26.

The main circuit 32 and the auxiliary circuit 34 are connected parallelly, the main circuit 32 is electrically connected with the supercapacitor module 12, and the auxiliary circuit 34 is electrically connected with the rechargeable battery 14, wherein the main circuit 32 is configured to recharge and discharge main electric currents, and the auxiliary circuit 34 is configured to recharge small electric currents, such that the rechargeable battery 14 electrically recharges the supercapacitor module 12 via the main circuit 32 or the auxiliary circuit 34, and the supercapacitor module 12 discharges electrically via the main circuit 32.

The control unit 40 is electrically connected with the processing unit 50, and the control unit 40 includes a first controller 42 and a second controller 44, wherein the first controller 42 is connected with the main circuit 32 and the rechargeable battery 14 serially, and the second controller 44 is connected with the auxiliary circuit 34 and the rechargeable battery 14 serially, such that the first controller 42 controls the connection circuit between the supercapacitor module 12 and the rechargeable battery 14 to generate or not via the main circuit 32, and the second controller 44 controls the connection circuit between the supercapacitor module 12 and the rechargeable battery 14 to produce or not via the auxiliary circuit 34, thus recharging or discharging the supercapacitor module 12. In another embodiment, the first controller 42 is connected with the main circuit 32 and the supercapacitor module 12 serially, and the second controller 44 is connected with the auxiliary circuit 34 and the supercapacitor module 12 serially. Furthermore, the first controller 42 and the second controller 44 are comprised of Metal-Oxide-Semiconductor Field-Effect Transistor (MOSFET) or a relay.

The processing unit 50 is a central processing unit (CPU) and the processing unit 50 is configured to compare, calculate, and process the fully charging voltage V2 and the safe temperature value T2 of the supercapacitor module 12, the external voltage V1 detected by the detection unit 20, and the voltage V3 and the ambient temperature value T1 of the supercapacitor module 12. Preferably, the processing unit 50 sends a controlling signal to the control unit 40 so as to drive the first controller 42 and the second controller 40 to operate, thus recharging and discharging the supercapacitor module 12 electrically.

Figure 4:
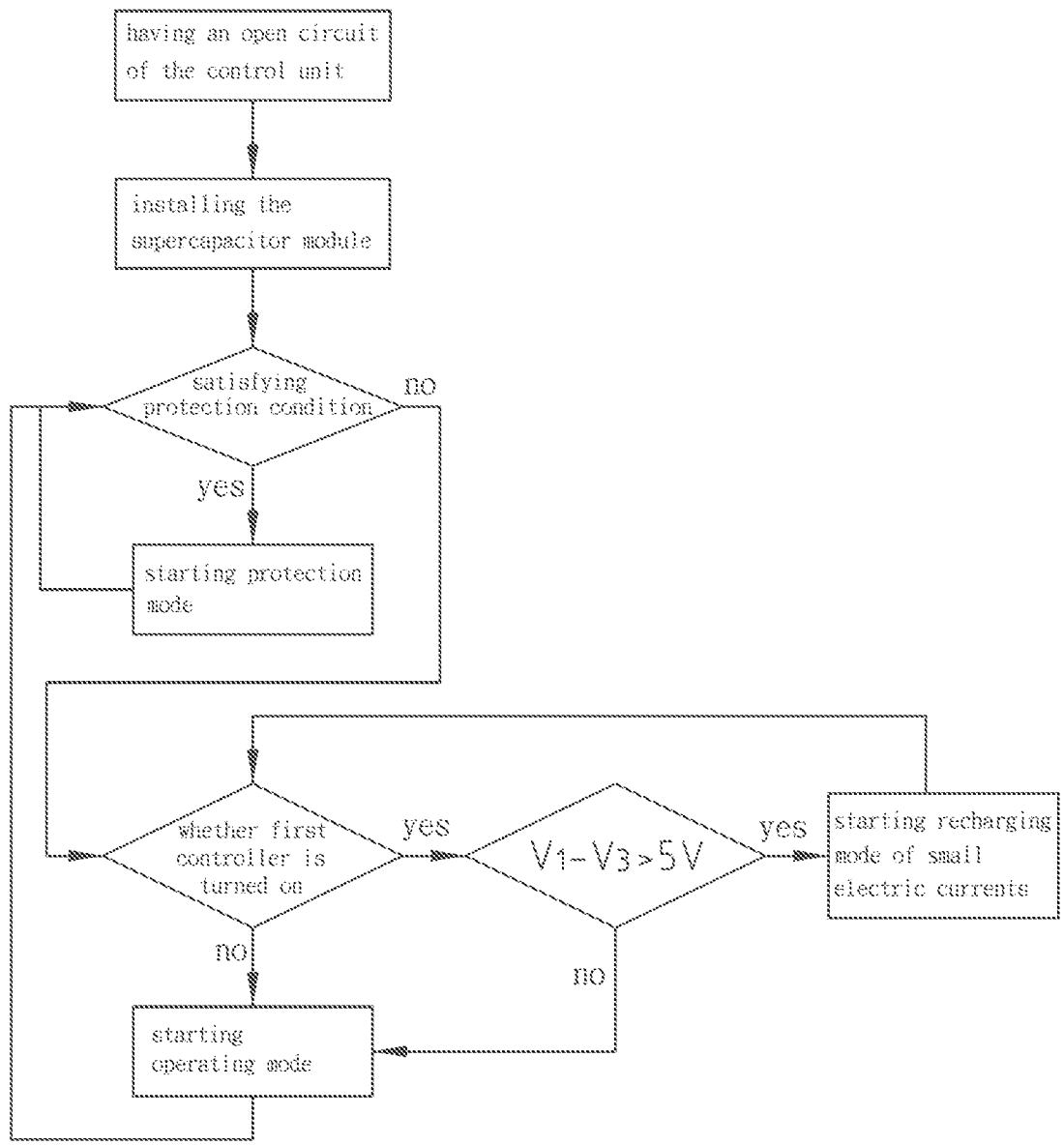
FIG. 4 is a flow chart of the method of executing the method of protecting the supercapacitor module according to the preferred embodiment of the present invention.

Referring to FIG. 4, the method of protecting the supercapacitor module of the vehicle is executed based on following description:

The open circuit occurs between the first controller 42 and the second controller 44 so as to install the supercapacitor module 12, wherein when installing the supercapacitor module 12, the rechargeable battery 14 does not recharge to the supercapacitor module 12, thus preventing the user getting an electric shock.

When the supercapacitor module 12 is judged whether it is satisfied with the protection condition after being installed, the detection unit 20 detects the external voltage V1 and the voltage V3 and the ambient temperature value T1 of the supercapacitor module 12, and the processing unit 50 compares whether the external voltage V1 is more than the fully charging voltage V2 and whether the ambient temperature value T1 is more than the safe temperature value T2 of the supercapacitor module 12; wherein when V1 is more than V2 or T1 is more than T2, the supercapacitor module 12 is satisfied with the protection condition; when V1 is not more than V2 and T1 is not more than T2, the supercapacitor module 12 is not satisfied with the protection condition.

When the supercapacitor module 12 is satisfied with the protection condition, the protection mode is started so that the processing unit 50 sends the controlling signal to the control unit 40, and the open circuit occurs between the first controller 42 and the second controller 44 so that the supercapacitor module 12 is not recharged and discharged electrically, and the supercapacitor module 12 is judged whether it is satisfied with the protection condition once more after the protection mode is started.

When the supercapacitor module 12 is not satisfied with the protection condition, the first controller 42 is judged whether it is turned off; when the first controller 42 is turned on, the operating mode will be started so that the processing unit 50 sends the controlling signal to the control unit 40, and the first controller 42 is turned off, hence the supercapacitor module 12 is rechargeable and dischargeable via the main circuit 32, and the rechargeable battery 14 of the engine of the vehicle is not rechargeable to the supercapacitor module 12 via the auxiliary circuit 34. When the first controller 42 is turned off, the processing unit 50 calculates whether a difference value between the external voltage V1 and the voltage V3 is more than 5V; when V1-V3 is more than 5V is not established, the processing unit 50 sends the controlling signal to the control unit 40 so that the operating mode is started, the first controller 42 is turned on and the second controller 44 is turned off.

When V1-V3 is more than 5V, a recharging mode of the small electric currents is started so that the processing unit 50 sends the controlling signal to the control unit 40, the first controller 42 is turned off, the second controller 44 is turned on, and the rechargeable battery 14 recharges the small electric currents to the supercapacitor module 12 via the auxiliary circuit 34. Since V1-V3 is more than 5V, the rechargeable battery 14 recharges the small electric currents to the supercapacitor module 12 but the supercapacitor module 12 is not rechargeable via the main circuit 32 so as to avoid a voltage difference between the rechargeable battery 14 and the supercapacitor module 12 producing, thus preventing large electric currents damaging the first controller 42 via the main circuit 32.

After the recharging mode of the small electric currents is started, the first controller 42 is judged whether it is turned off so as to further judge whether V1-V3 is more than 5V or to start the operating mode.

It is to be note than the difference value between the external voltage V1 and the voltage V3 is rechargeable except for 5V, and 5V is an empirical value based on an actual test of a sample.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of protecting a supercapacitor module of a vehicle being applicable for a power supply unit of the vehicle, and the power supply unit including the supercapacitor module and a rechargeable battery connected with the supercapacitor module parallelly, the method comprising steps of:

A) installing the supercapacitor module, wherein an open circuit remains between the rechargeable battery and the supercapacitor module, a voltage value of the supercapacitor module is 0, and the supercapacitor module is arranged in the power supply unit;

B) judging, wherein the supercapacitor module is judged whether the supercapacitor module is satisfied with a protection condition, an external voltage is V1, a fully charging voltage of the supercapacitor module is V2, an ambient temperature value of an interior of the supercapacitor module is T1, and a safe temperature value of a respective supercapacitor is T2, wherein when V1 is more than V2 (V1>V2) or T1 is more than T2 (T1>T2), the supercapacitor module is satisfied with the protection condition, and when V1 is not more than V2 or T1 is not more than T2, the supercapacitor module is not satisfied with the protection condition;

C) executing a protection mode, wherein when the supercapacitor module is satisfied with the protection condition, the protection mode is executed, wherein the open circuit occurs between the supercapacitor module and the rechargeable battery so that the supercapacitor module is not rechargeable and dischargeable electrically; and D) executing an operating mode when the supercapacitor module is not satisfied with the protection condition, wherein when a connection circuit between the supercapacitor module and the rechargeable battery occurs, the supercapacitor module is rechargeable and dischargeable electrically;

wherein when the supercapacitor module is in the protection mode or the operating mode, the step B) is executed so as to further execute the protection mode or the operating mode based on a result of the step B).

2. The method as claimed in claim 1, wherein the external voltage V1 is a higher voltage selected from a voltage of a power generator of the vehicle and the voltage of the rechargeable battery.

3. The supercapacitor module of claim 2 comprising: a detection unit, a main circuit, an auxiliary circuit, a control unit, and a processing unit, wherein the detection unit and the processing unit are electrically connected with the processing unit, the main circuit and the auxiliary circuit are connected parallelly, the main circuit is electrically connected with the supercapacitor module, and the auxiliary circuit is electrically connected with the rechargeable battery, wherein the main circuit is configured to recharge and discharge main electric currents, and the auxiliary circuit is configured to recharge small electric currents, such that the rechargeable battery electrically recharges the supercapacitor module via the main circuit or the auxiliary circuit, and the supercapacitor module discharges electrically via the main circuit;

wherein the detection unit includes a first voltage detector, a second voltage detector, and a temperature sensor, wherein the first voltage detector is configured to detect the external voltage V1, the second voltage detector is configured to detect a voltage V3 of the supercapacitor module, the temperature detector is configured to detect the ambient temperature value T1 of the supercapacitor module;

wherein the control unit includes a first controller and a second controller, the first controller controls the connection circuit between the supercapacitor module and the rechargeable battery to generate or not via the main circuit, and the second controller controls the connection circuit between the supercapacitor module and the rechargeable battery to produce or not via the auxiliary circuit, thus recharging or discharging the supercapacitor module;

wherein the processing unit is configured to compare, calculate, and process the fully charging voltage V2 and the safe temperature value T2 of the supercapacitor module, the external voltage V1 detected by the detection unit, and the voltage V3 and the ambient temperature value T1 of the supercapacitor module, such that the processing unit sends a controlling signal to the control unit so as to drive the first controller and the second controller to operate, thus recharging and discharging the supercapacitor module electrically.

4. The supercapacitor module of claim 3, wherein the first controller is connected with the main circuit and the rechargeable battery serially, and the second controller is connected with the auxiliary circuit and the rechargeable battery serially.

5. The supercapacitor module of claim 3, wherein the first controller is connected with the main circuit and the supercapacitor module serially, and the second controller is connected with the auxiliary circuit and the supercapacitor module serially.

6. The supercapacitor module of claim 3, wherein the first controller and the second controller are comprised of Metal-Oxide-Semiconductor Field-Effect Transistor (MOSFET) or a relay.

7. The method as claimed in claim 1, wherein V2 is 14.5V.

8. The supercapacitor module protected by the method of claim 7 comprising: a detection unit, a main circuit, an auxiliary circuit, a control unit, and a processing unit, wherein the detection unit and the processing unit are electrically connected with the processing unit, the main circuit and the auxiliary circuit are connected parallelly, the main circuit is electrically connected with the supercapacitor module, and the auxiliary circuit is electrically connected with the rechargeable battery, wherein the main circuit is configured to recharge and discharge main electric currents, and the auxiliary circuit is configured to recharge small electric currents, such that the rechargeable battery electrically recharges the supercapacitor module via the main circuit or the auxiliary circuit, and the supercapacitor module discharges electrically via the main circuit;

wherein the detection unit includes a first voltage detector, a second voltage detector, and a temperature sensor, wherein the first voltage detector is configured to detect the external voltage V1, the second voltage detector is configured to detect a voltage V3 of the supercapacitor module, the temperature detector is configured to detect the ambient temperature value T1 of the supercapacitor module;

wherein the control unit includes a first controller and a second controller, the first controller controls the connection circuit between the supercapacitor module and the rechargeable battery to generate or not via the main circuit, and the second controller controls the connection circuit between the supercapacitor module and the rechargeable battery to produce or not via the auxiliary circuit, thus recharging or discharging the supercapacitor module;

wherein the processing unit is configured to compare, calculate, and process the fully charging voltage V2 and the safe temperature value T2 of the supercapacitor module, the external voltage V1 detected by the detection unit, and the voltage V3 and the ambient temperature value T1 of the supercapacitor module, such that the processing unit sends a controlling signal to the control unit so as to drive the first controller and the second controller to operate, thus recharging and discharging the supercapacitor module electrically.

9. The supercapacitor module of claim 8, wherein the first controller is connected with the main circuit and the rechargeable battery serially, and the second controller is connected with the auxiliary circuit and the rechargeable battery serially.

10. The supercapacitor module of claim 8, wherein the first controller is connected with the main circuit and the supercapacitor module serially, and the second controller is connected with the auxiliary circuit and the supercapacitor module serially.

11. The supercapacitor module of claim 8, wherein the first controller and the second controller are comprised of Metal-Oxide-Semiconductor Field-Effect Transistor (MOSFET) or a relay.

12. The method as claimed in claim 1, wherein T2 is 80° C.

13. The supercapacitor module protected by the method of claim 12 comprising: a detection unit, a main circuit, an auxiliary circuit, a control unit, and a processing unit, wherein the detection unit and the processing unit are electrically connected with the processing unit, the main circuit and the auxiliary circuit are connected parallelly, the main circuit is electrically connected with the supercapacitor module, and the auxiliary circuit is electrically connected with the rechargeable battery, wherein the main circuit is configured to recharge and discharge main electric currents, and the auxiliary circuit is configured to recharge small electric currents, such that the rechargeable battery electrically recharges the supercapacitor module via the main circuit or the auxiliary circuit, and the supercapacitor module discharges electrically via the main circuit;

wherein the detection unit includes a first voltage detector, a second voltage detector, and a temperature sensor, wherein the first voltage detector is configured to detect the external voltage V1, the second voltage detector is configured to detect a voltage V3 of the supercapacitor module, the temperature detector is configured to detect the ambient temperature value T1 of the supercapacitor module;

wherein the control unit includes a first controller and a second controller, the first controller controls the connection circuit between the supercapacitor module and the rechargeable battery to generate or not via the main circuit, and the second controller controls the connection circuit between the supercapacitor module and the rechargeable battery to produce or not via the auxiliary circuit, thus recharging or discharging the supercapacitor module;

wherein the processing unit is configured to compare, calculate, and process the fully charging voltage V2 and the safe temperature value T2 of the supercapacitor module, the external voltage V1 detected by the detection unit, and the voltage V3 and the ambient temperature value T1 of the supercapacitor module, such that the processing unit sends a controlling signal to the control unit so as to drive the first controller and the second controller to operate, thus recharging and discharging the supercapacitor module electrically.

14. The supercapacitor module of claim 13, wherein the first controller is connected with the main circuit and the rechargeable battery serially, and the second controller is connected with the auxiliary circuit and the rechargeable battery serially.

15. The supercapacitor module of claim 13, wherein the first controller is connected with the main circuit and the supercapacitor module serially, and the second controller is connected with the auxiliary circuit and the supercapacitor module serially.

16. The supercapacitor module of claim 13, wherein the first controller and the second controller are comprised of Metal-Oxide-Semiconductor Field-Effect Transistor (MOSFET) or a relay.

17. The supercapacitor module protected by the method of claim 1 comprising: a detection unit, a main circuit, an auxiliary circuit, a control unit, and a processing unit, wherein the detection unit and the processing unit are electrically connected with the processing unit, the main circuit and the auxiliary circuit are connected parallelly, the main circuit is electrically connected with the supercapacitor module, and the auxiliary circuit is electrically connected with the rechargeable battery, wherein the main circuit is configured to recharge and discharge main electric currents, and the auxiliary circuit is configured to recharge small electric currents, such that the rechargeable battery electrically recharges the supercapacitor module via the main circuit or the auxiliary circuit, and the supercapacitor module discharges electrically via the main circuit;

wherein the detection unit includes a first voltage detector, a second voltage detector, and a temperature sensor, wherein the first voltage detector is configured to detect the external voltage V1, the second voltage detector is configured to detect-the a voltage V3 of the supercapacitor module, the temperature detector is configured to detect the ambient temperature value T1 of the supercapacitor module;

wherein the control unit includes a first controller and a second controller, the first controller controls the connection circuit between the supercapacitor module and the rechargeable battery to generate or not via the main circuit, and the second controller controls the connection circuit between the supercapacitor module and the rechargeable battery to produce or not via the auxiliary circuit, thus recharging or discharging the supercapacitor module;

wherein the processing unit is configured to compare, calculate, and process the fully charging voltage V2 and the safe temperature value T2 of the supercapacitor module, the external voltage V1 detected by the detection unit, and the voltage V3 and the ambient temperature value T1 of the supercapacitor module, such that the processing unit sends a controlling signal to the control unit so as to drive the first controller and the second controller to operate, thus recharging and discharging the supercapacitor module electrically.

18. The supercapacitor module of claim 17, wherein the first controller is connected with the main circuit and the rechargeable battery serially, and the second controller is connected with the auxiliary circuit and the rechargeable battery serially.

19. The supercapacitor module of claim 17, wherein the first controller is connected with the main circuit and the supercapacitor module serially, and the second controller is connected with the auxiliary circuit and the supercapacitor module serially.

20. The device protected by the method supercapacitor module of claim 17, wherein the first controller and the second controller are comprised of Metal-Oxide-Semiconductor Field-Effect Transistor (MOSFET) or a relay.

* * * * *